United States Patent [19]

Hagemeister et al.

[11] Patent Number: 4,626,002

[45] Date of Patent: Dec. 2, 1986

[54] SELF-ACTING SEAL BETWEEN ADJACENT PIPE ENDS OF A PRESSURE VESSEL

[75] Inventors: Klaus Hagemeister, Munich; Alfred Hueber, Merching, both of Fed. Rep. of Germany

[73] Assignee: MTU, Munich, Fed. Rep. of Germany

[21] Appl. No.: 692,662

[22] Filed: Jan. 17, 1985

[30] Foreign Application Priority Data

Jan. 18, 1984 [DE] Fed. Rep. of Germany ....... 3401569

[51] Int. Cl.⁴ .................. F16L 17/00; F16J 15/16
[52] U.S. Cl. .................................. 285/95; 285/108; 285/370; 285/917; 277/27; 277/151; 277/230
[58] Field of Search .............. 285/DIG. 1, DIG. 11, 285/DIG. 12, DIG. 18, 55, 95, 108, 109, 260, 370, 397, 900, 910, 911, 917; 277/230, 164, 233 B, 233, 151, 27, 30; 60/230; 65/43

[56] References Cited

U.S. PATENT DOCUMENTS

| | | | |
|---|---|---|---|
| 1,648,391 | 11/1927 | Farrington | 277/233 |
| 1,931,922 | 10/1933 | Damsel et al. | 285/DIG. 11 |
| 2,079,949 | 5/1937 | Novati | 285/108 |
| 2,533,742 | 12/1950 | Poltorak | 277/227 |
| 2,998,269 | 8/1961 | Houghton | 285/260 |
| 3,078,110 | 2/1963 | Starr | 285/DIG. 18 |
| 3,241,867 | 3/1966 | Guarnaschelli | 285/109 |
| 3,269,754 | 8/1966 | Bertling et al. | 285/109 |
| 4,311,313 | 1/1982 | Vedova et al. | 285/268 |
| 4,328,022 | 5/1982 | Bonk et al. | 65/43 |
| 4,346,922 | 8/1982 | Ohtsuga et al. | 285/370 |
| 4,433,962 | 2/1984 | Kloss | 65/43 |
| 4,452,462 | 6/1984 | Karr, Jr. | 285/DIG. 18 |
| 4,469,467 | 9/1984 | Odill et al. | 285/109 |

FOREIGN PATENT DOCUMENTS

508990 7/1939 United Kingdom ............... 277/230

Primary Examiner—Cornelius J. Husar
Assistant Examiner—Anthony Knight
Attorney, Agent, or Firm—Roberts, Spiecens & Cohen

[57] ABSTRACT

A self-acting gap seal for a gap existing between individual modules of a composite, annular pressure vessel comprising a flat, thin-walled seal element on the inside of the pressure vessel to bridge the gap plus the circumferential region adjacent the gap. Internal pressure urges the seal element against the inner wall of the vessel to close and seal the gap to prevent exit of the pressure medium in the vessel.

20 Claims, 34 Drawing Figures

SELF-ACTING SEAL BETWEEN ADJACENT PIPE ENDS OF A PRESSURE VESSEL

FIELD OF THE INVENTION

This invention relates to a self-acting seal for a circumferential gap between adjacent pipe ends of a pressure vessel comprising a seal element which is guided for axial and radial movement and which closes the circumferential gap under the action of internal pressure in the vessel which is greater than ambient pressure.

DESCRIPTION OF PRIOR ART

U.S. Pat. No. 4,311,313 discloses a gap seal for a thrust deflector of a gas turbine jet engine for aircraft. In this construction, a movable jet pipe is supported on a stationary jet pipe for limited, three-dimensional movement about a fixed pipe center, and for mutual pipe sealing along a spherically vaulted curved track, an external seal carrier is arranged either at the exit end of the stationary jet pipe or at the inlet end of the movable jet pipe. Arranged in the seal carrier is a seal ring composed of individual, rigid, sealing bodies that are circumferentially strung together and are urged, under the gas pressure prevailing in the interior of the pipe, against an end wall of the seal carrier, which has pressure pockets and also radially outwards against a spherical surface of a corresponding wall of the movable or stationary jet pipe. In the inoperative condition, a garter-type spring circumferentially arranged in the seal carrier prevents the seal ring from collapsing radially.

This construction is deficient, however, in flexibly and consistently bridging and sealing axially aligned, mutually corresponding stationary pipe ends in the presence of distortions or dislocations of the pipe faces under thermal or gas loads. With reference to the common longitudinal vessel centerline, therefore, the effects to be considered would not only be the radially acting variations in position and distortion between the respective adjacent pipe ends to be bridged and sealed, but also the endwise expansions and contractions of the pipes; the cited U.S. patent fails to provide any concrete solution with respect to the matter.

SUMMARY OF THE INVENTION

An object of the present invention is to provide a self-acting seal which is of simple construction and is easy to install and which gives proper and lasting sealing action even in the presence of distortions or dislocations acting on the adjacent pipe ends as a result of temperature or applied forces.

In order to satisfy the above and further objects of the invention, there is provided a self-acting seal assembly for sealing the circumferential gap between adjacent pipe ends of a pressure vessel which is adapted for carrying a pressure medium at a pressure greater than ambient pressure. The seal assembly according to the invention comprises a seal element which closes the circumferential gap under the internal pressure in the vessel by the pressure medium. The seal element is supported for guided movement axially and radially by inner surfaces formed at the adjacent pipe ends of the vessel.

In further accordance with the invention, the seal element is composed of a flexible, relatively thin walled element which is capable of flexing across its width, and the adjacent pipe ends which form the wall of the vessel are provided with the surfaces which axially and radially guide the movement of the seal element.

The basic operating principle of the sealing element is to bridge and seal gaps, especially annular gaps, with flat and flexible means, where the pressure inside the pressure vessel to be sealed supplies the force needed to close the seal. In the process, the seal element flexibly compensates for moderate dislocations of the vessel elements or modules relative to one another.

Due to their flat shape, the sealing elements are urged by the internal pressure against the inner wall of the adjacent vessel modules that form the intervening gap between them.

It is a further object of the present invention for the sealing element to follow circumferential variations in expansion of the vessel walls under temperature and pressure effects and be able to flexibly absorb tolerances of the adjacent edges of the vessel walls in respect of axial clearance, radial offset and angular deviation. The seal element can also compensate for axial displacements of adjacent edges of vessel walls caused by thermal expansion and mechanical load by axially sliding over the inner vessel wall.

In accordance with a feature of the invention, a supporting element to support the seal element can be provided especially where the gaps to be bridged are wide.

In another feature of the invention, proper retention is provided additionally in the inoperative condition by retaining plates or rings for the seal elements in the interior of the vessel.

The circumferential gap in the vessel wall is preferably recessed, and the seal element is arranged in the recess with provision for lateral location.

Especially effective support is provided in the inoperative condition if the recess in the vessel wall is provided with retaining webs for the seal element in the interior of the vessel.

The present invention is particularly directed to the sealing of annular gaps and for this purpose, the seal element is advantageously formed by at least one, essentially annular sheet strip with overlapping ends. The sheet strip is formed of a suitable material for the specific application. In a particular aspect of the present invention, the seal element is preferably made of metallic glass and is resistant to heat, scaling and/or abrasion.

For sealing wide gaps or for added sealing action, the sheet strip can be applied in several layers.

In a particular embodiment, the sheet strip is thickened and/or ribbed for strength or corrugated in the gap sealing area.

The sheet strip may also be perforated or slotted in the circumferential gap area. If it is perforated or slotted over its entire extent, use is made of at least two layers of sheet strip one over the other to ensure proper sealing action. For the purpose, the sheet strip comes in one piece.

Alternatively, the perforated or slotted sheet strip may also come in several pieces in which case, individual sheet strip ends are arranged one over the other and overlapped for proper sealing.

The basic concept of the present invention of a seal that automatically closes under the pressure of the medium also embraces a construction in which the seal element is formed by a plurality of scales, lamellae or rods in horizontally or vertically adjacent arrangement.

The seal elements can also be combined or arranged in packages.

Also conceivable is a laminar structure of seal elements consisting of scales, lamellae or rods.

Similar to the arrangement of a sheet strip, the seal elements if consisting of scales or the like can be provided also in the form of several layers.

For best results, the various layers or packages are welded or brazed to one another.

In an alternative arrangement, a sheet strip is arranged between the scales, lamellae or rods.

The seal elements are advantageously movably connected to one another at their lateral edges, particularly by being inter-linked or interweaved or connected by longitudinal or circumferential rods.

The materials for the seal can be selected to suit specific seals and media, and can be provided with a wear-resistant protective coating.

BRIEF DESCRIPTION OF THE FIGURES OF THE DRAWING

The invention is described more fully by way of specific embodiments thereof with reference to the accompanying drawings, in which:

FIGS. 21e and 21f respectively show, in perspective, the embodiment of FIG. 21b in exploded and assembled states;

FIG. 22 is a front view of the seal of FIG. 21a,

FIG. 24 is a sectional view of a multi-layer seal.

DETAILED DESCRIPTION OF PREFERRED EMBODIMENTS

Figure 1:
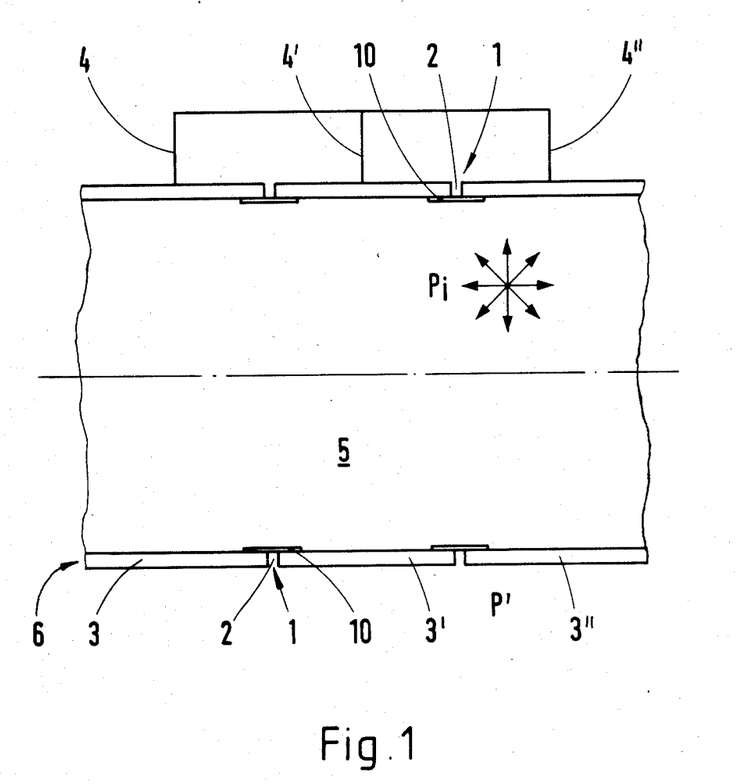
FIG. 1 is a longitudinal sectional view illustrating, in schematic arrangement, a tubular vessel wall composed of a plurality of pipe elements, or modules, the spaced edges of which require sealing.

FIG. 1 schematically shows gap seals 1 for a tubular pressure vessel 5 composed of several annular pipe elements or modules 3,3', 3" in axially aligned assembly. Remaining between the various modules 3,3' and 3" are circumferential gaps 2 of a finite width permitting the modules to expand during operation. External retaining elements 4,4' and 4" are used to hold the various modules 3,3' and 3" in relative alignment.

The pressure vessel 5 carries a pressure medium and thereby is internally pressurized at a pressure $P_i$. The pressure $P_i$ acts on the gap seals 1 in a radially outwards direction. More particularly, the gap seals 1 include inner seal elements 10 on which the internal pressure acts, said inner seal elements being in the form of sheet strips which flexibly bridge the gaps 2. The sheet strips are substantially wider than the gaps and due to their width they are urged, by the internal pressure $P_i$, against the internal walls of the adjacent modules 3, 3' and 3" forming the gap 2, causing the gap 2 to be closed and sealed to prevent the exit of the pressure medium.

The basic object of the present invention is to provide a construction for the seal 1 which will be self-acting and wherein the seal element 10 is axially and radially guided to close the circumferential gap 2 under the action of the internal pressure $P_i$. The invention also contemplates that the adjacent ends of the modules are provided with sealing and moving guide surfaces 15',16' at their inner walls for receiving the seal element 10. The seal element 10 is a flat, flexible and relatively thin-walled element accommodated in the wall 6 of the pressure vessel 5.

Figure 2:
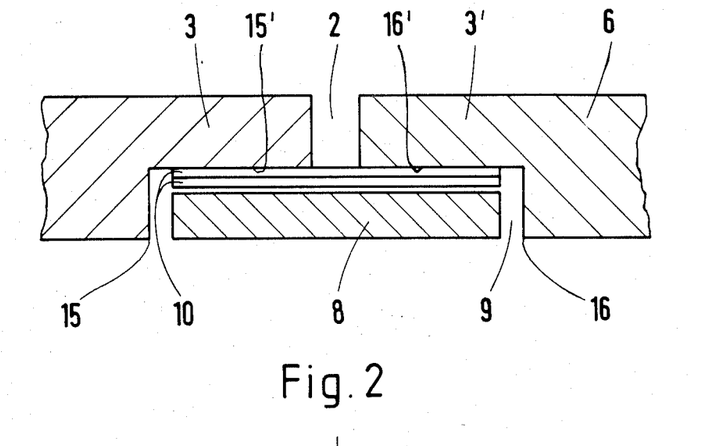
FIG. 2 is a detail view of a modified embodiment of FIG. 1 showing the sealing area with an internal retaining ring.

In FIG. 2, it is seen that the maximum axial travel of the seal element 10, along the sealing and guiding surfaces 15', 16' is defined by the axial distance between two lateral, radially inwardly projecting shoulders 15,16. The width of sealing gap 2 and the distance between the two shoulders 15, 16 is made large enough to accommodate thermally induced differences in expansion or contraction of the two respective ends of the pipe modules 3 or 3' without disturbing the sealing fit of the sheet strip 10.

Figure 3:
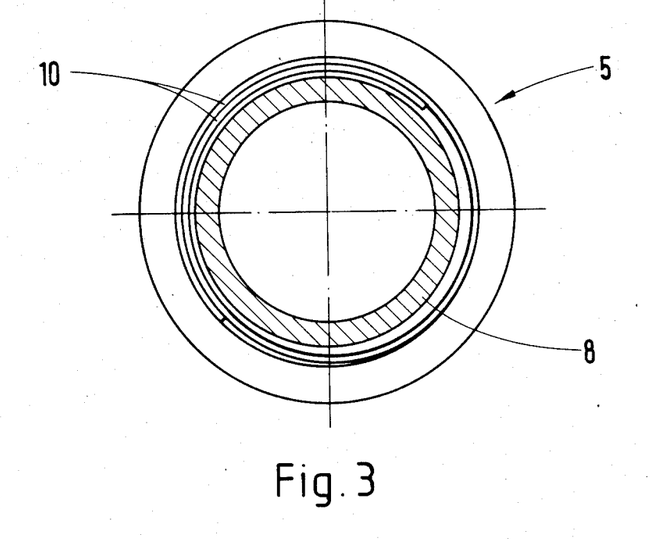
FIG. 3 is a transverse sectional view illustrating the construction in FIG. 2.
Figure 9:
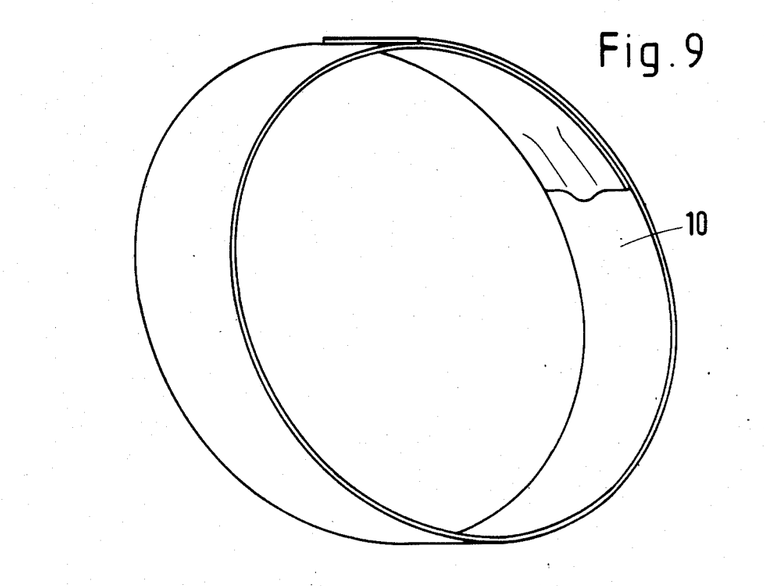
FIG. 9 is a perspective view illustrating an annular sheet strip seal element with overlapping ends.

The sheet strip 10 consists of metallic glass which is heat-resistant, and scale or abrasion resistant. The sheet strip is internally inserted into the inner surface of the wall 6 of the pipe connection. The ends of the sheet strip overlap as illustrated in FIGS. 3 and 9, or the sheet strip can be wound to form several layers around the circumference.

The modules 3,3' and 3" are provided at their inner surfaces with recesses 9 in the gap area to accommodate the sheet strips 10. The recesses form the internal, lateral shoulders 15 and 16, which serve as axial stops to limit axial displacement of the seal element.

It may be necessary to locally locate the sheet strip 10 by means of an internally inserted retaining ring 8 if the strip tends to lift off the sealing area under internal strain when the operating pressure is relieved during system shutdown.

Figure 4:
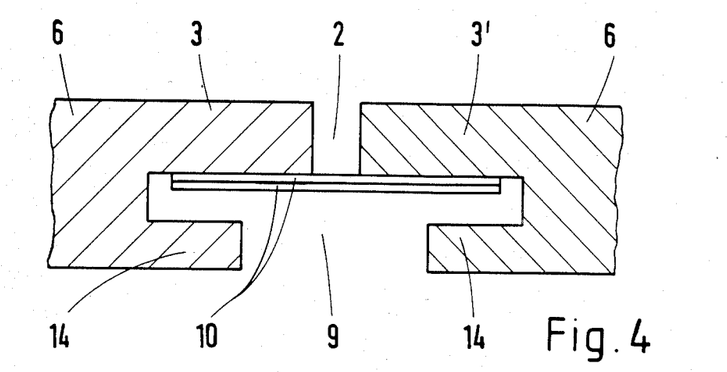
FIG. 4 is a sectional view similar to FIG. 2 of another embodiment.
Figure 5:
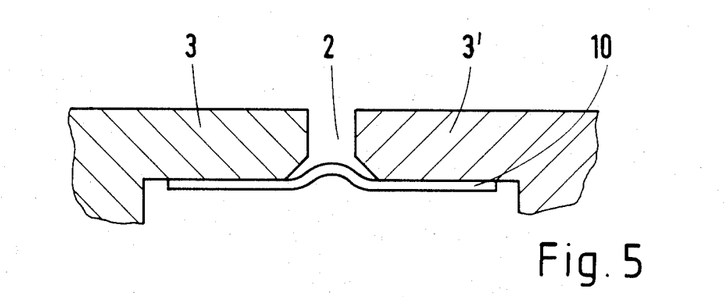
FIGS. 5 to 8 illustrate various seal elements in sectional view similar to FIGS. 2 and 4.
Figure 6:
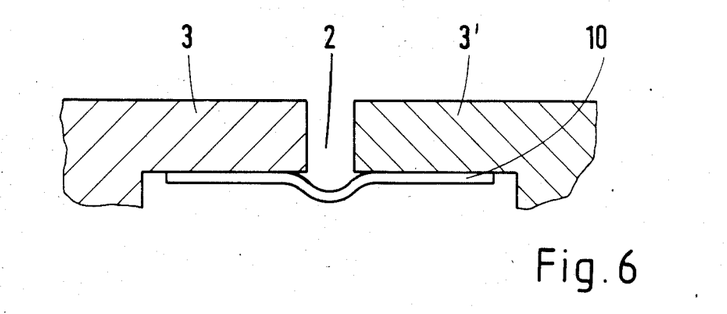
Figure 7:
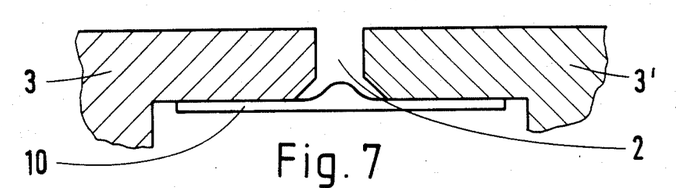
Figure 8:
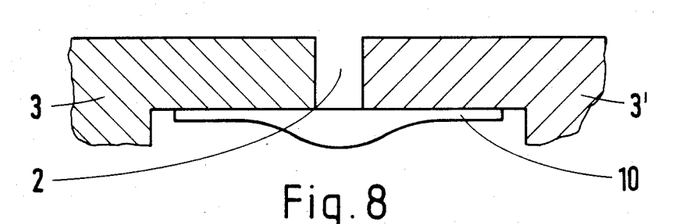

The retaining function can also be obtained by internal, retaining webs 14 as shown in FIG. 4, which are an integral part of the vessel wall 6.

According to a further aspect of the present invention, the sheet strip may be perforated or slotted, especially in the area of overlapping layers, to control the effect of differences of contact pressure from the working medium and the reactions from the abutment surfaces to suit local conditions.

In a further advantageous construction, the sheet strip is provided in the area of gap 2 to be bridged, and as shown in FIGS. 5, 6, 7 and 8, with internally or externally thickened or ribbed portions to alleviate stresses in the gap bridging area and produce a circumferential resistance action. These results can also be obtained in part in the area of the overlapping circumferential joint, as shown in the embodiment of FIG. 9, in order to advantageously control the size and rigidity by adjusting the degree of overlap. In FIG. 9 the inner layer of the strip 10 is provided with an inner ribbed portion at its end.

Figure 10:
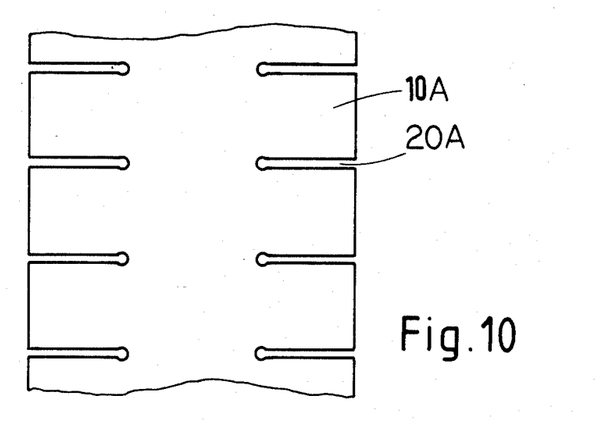
FIGS. 10, 11 and 13 to 16 are plan views of slotted sheet seal elements according to different embodiments.
Figure 11:
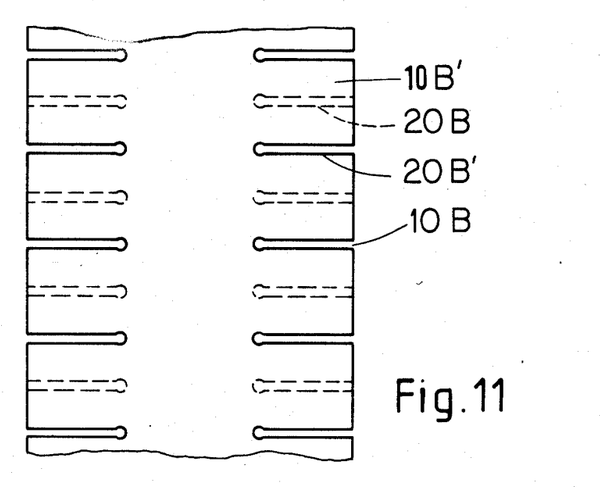
Figure 13:
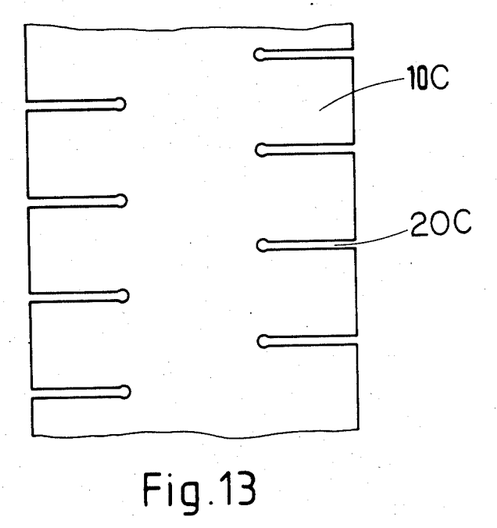
Figure 14:
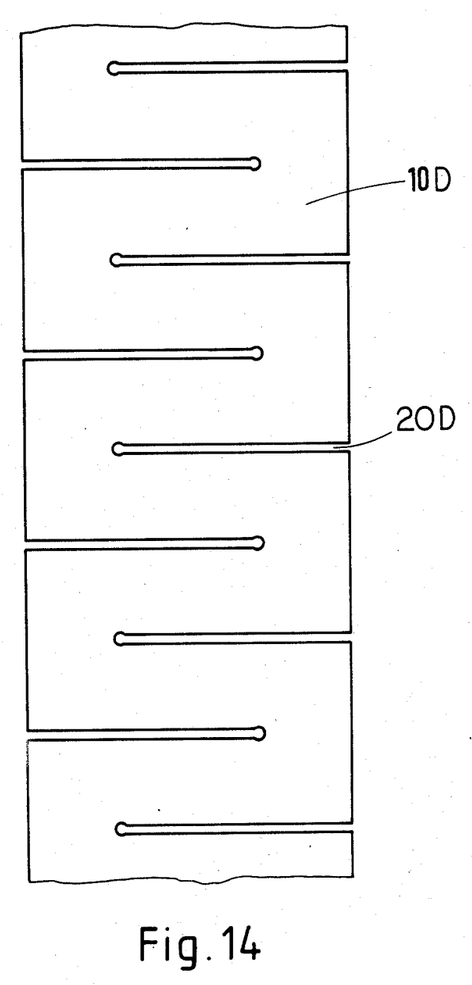

In a further aspect of the present invention, the sheet strip can also be provided with transverse slots, as shown, for example, at 20A for strip 10A in FIG. 10, at 20B for strip 10B in FIGS. 11, at 20C for strip 10C in FIG. 13 and 20D for strip 10D in FIG. 14. The provision of the transverse slots serves as aperture means which makes the surface area of the strip which is urged against the vessel walls at the gap under the pressure of the working medium to be more flexible and able to hug the mating surface especially when there is relative deviation in form, position and size between adjacent vessel ends. A second slotted sheet strip 10B' can be inserted into the first layer of a slotted sheet strip 10B to cover the slots and seal points of leakage as shown in FIG. 11. The second sheet strip may also be formed as a unitary piece together with the first sheet strip forming its second layer.

The sheet strip seals can also be formed as an endless, continuous, closed band, with no circumferential gap since differences in diameter of the interacting parts in the sealing area can be taken-up by the great flexibility of the area of the sheet strip.

Figure 12:
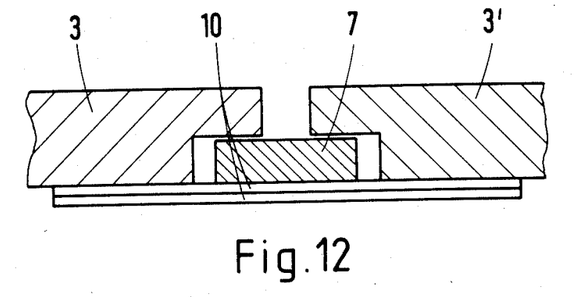
FIG. 12 is a sectional view corresponding to FIG. 2 showing an external supporting element.

Inasmuch as a continuous band will produce tangential stresses under the internal pressure acting on the band, it may be necessary to provide an additional supporting element as shown by numeral 7 in FIG. 12. The supporting element 7 is a circumferentially continuous ring but it may also be constructed of supporting ring segments which when assembled form a closed ring.

A supporting ring as described above can also be used with the open sheet strip 10 of FIGS. 2 to 4.

In a further aspect of the present invention, the slots in the sheet strip may be staggered as shown by slots 20C in FIG. 13 or they may be overlapping as shown by slots 20D in FIG. 14.

Figure 15:
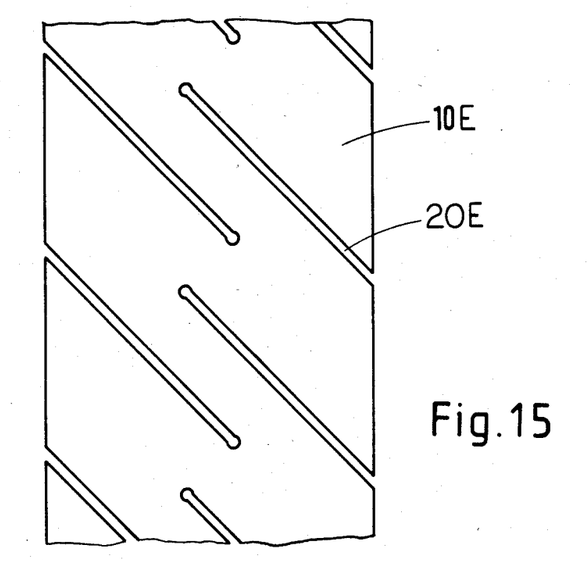
Figure 16:
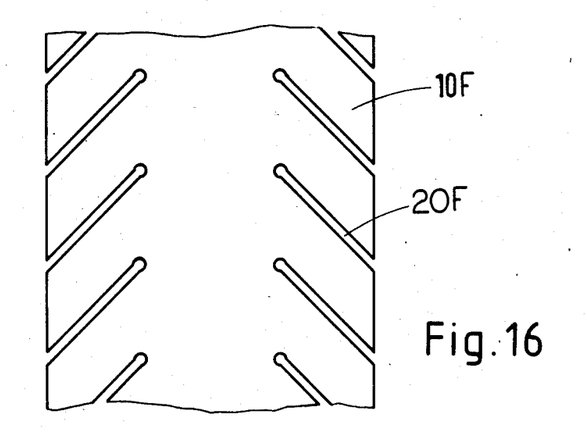

The slots may also extend at an angle with respect to the circumferential direction of the sheet strip, as shown by slots 20E in strip 10E in FIG. 15 and by slots 20F in strip 10F in FIG. 16.

The basic principle of the present invention may be realized also with seal elements of the type illustrated in the embodiments of FIGS. 17 to 23.

Figures 17A, 17B, 17C, 17D, 18:
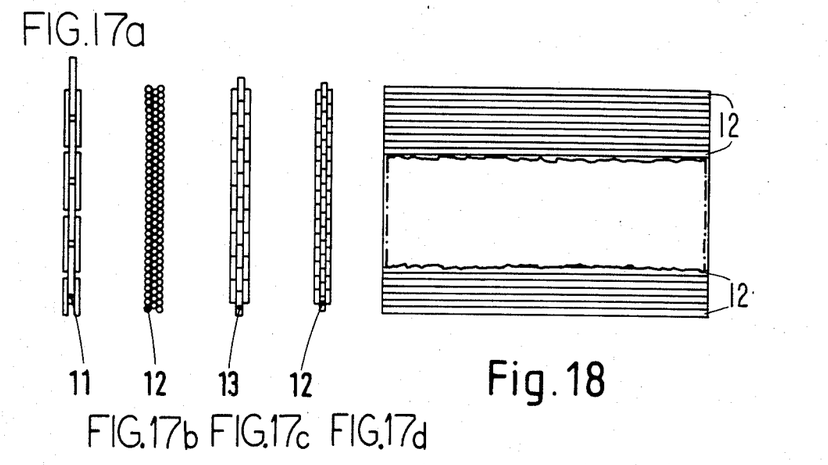
FIG. 17a is a front view, illustrating a portion of a seal having scale-like seal elements in a laminar construction.
FIG. 17b is a front view illustrating a portion of a seal having circular rod seal elements in a laminar construction.
FIG. 17c is a front view illustrating a portion of a seal having lamellae seal elements in a laminar construction.
FIG. 17d is a view illustrating a portion of a seal having square rod seal elements in a laminar construction.
FIG. 18 is a side view of the seal shown in FIG. 17b.
Figure 19:
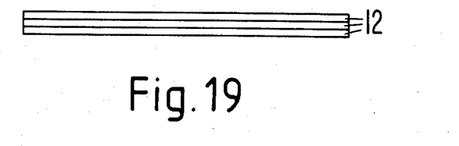
FIG. 19 is a longitudinal view of the seal shown in FIG. 18.

FIGS. 17 to 19 illustrate seal elements in the form of several, horizontally or vertically grouped members constituted by plates or scales 11, lamellae 13 or rods 12.

In the manufacture of the seal, the scales 11, lamellae 13 or rods 12 can be combined into packages. The seal, however, can also be a laminar construction, where each ply of horizontally grouped elements forms a layer, and where these layers are superimposed and assembled to form the seal.

In the latter case, the layer of horizontally grouped elements can be held together, for example, by means of a thin plastic sheet which connects the elements in line by adhesion. For the same purpose, the faces of the elements can also be adhesively joined or joined by fusion. In this manner the elements are arranged in a strip as apparent especially from FIGS. 18 and 19.

Figure 20:
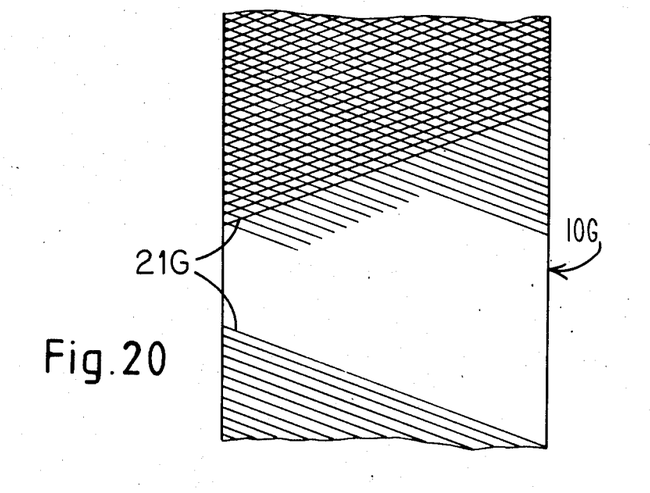
FIG. 20 is a view similar to FIG. 18 showing rod-shaped seal elements arranged crosswise.
Figure 21:
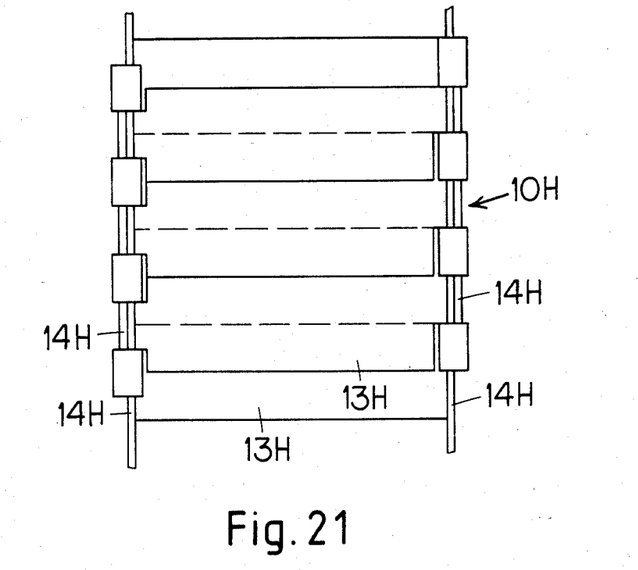
FIGS. 21a and 21b show respective embodiments of plate-like seal elements connected together at their edges by lateral rods.
FIGS. 21c and 21d respectively show, in perspective, the embodiment of FIG. 21a in exploded and assembled states.
FIGS. 21e and 21f respectively show, in perspective, the embodiment of FIG. 21a in exploded and assembled states.
Figure 22:
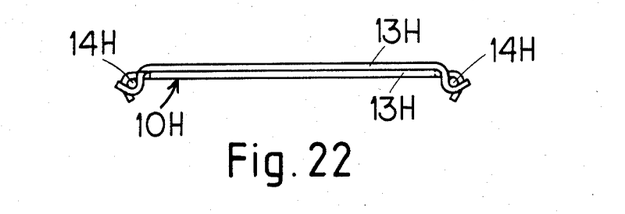
Figure 23:
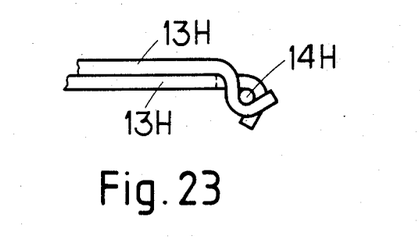
FIG. 23 shows, on enlarged scale, the right-hand edge connection of the seal elements in FIG. 22

In the manufacture of the seal, the strips can be arranged one on the other in any number as desired, where the elements of one layer may be arranged at an angle with those of the next to achieve a partially crosswise arrangement as diagrammatically illustrated by strips 21G for seal 10G in FIG. 20

Integration of the packages or layers into seal strips can be achieved, for example, by central welding or brazing. For this purpose, filler material can be provided locally on the individual element or the premanufactured laminar strip. The energy required for joining can be applied by conventional welding techniques, such as electrical roller seam welding, flame welding or brazing in a furnace or using a flame.

The seal configurations of the embodiments in FIGS. 17 to 23 may require a supporting element in the area of the gap 2 to be bridged, as previously described in connection with the embodiment of FIG. 12, to absorb, via tangential or bending forces, the radial forces developed from the internal pressure.

It may be an advantage to insert a sheet between the layers of lamellae or rods in FIGS. 17 to 20. This is shown in FIG. 24 where a sheet 30 is inserted between layers 31 and 32.

Seals of the construction used in FIGS. 17 to 20 can also be constructed such that the elements are movably connected, particularly by a link connection one to the other at their lateral edges. This may be achieved, for example, in the manner shown in FIGS. 21a, 21c, 21d, where the seal 10H comprises plates or scales 13H and lateral, flexible rods or cords 14H. FIGS. 21b, 21e and 21f show a modified seal 10H' in which the plates 13H' are slightly modified at their edges where they engage cords 14H'. In the embodiments shown in FIGS. 17 to 20 the layers can also be interweaved at their edges.

In order to sufficiently resist wear of the seal under the action of displacement of the vessel edges to be bridged, it is suitable to provide the surfaces of the seal with protective layers where they are exposed to frictional relative movement.

Although the invention has been described in conjunction with specific embodiments thereof, it will become apparent to those skilled in the art that numerous modifications and variations can be made within the scope and spirit of the invention as defined in the attached claims.

What is claimed is:

1. A self-acting seal assembly for a circumferential gap between adjacent pipe ends of a pressure vessel adapted for carrying a pressure medium at a pressure greater than ambient pressure, said seal assembly comprising a seal element closing said circumferential gap under the internal pressure in the vessel by the pressure medium, the adjacent pipe ends of the vessel at said gap having inner surfaces for guiding axial and radial movement of said seal element, said seal element including a flexible, relatively thin-walled element capable of flexing across its width, said adjacent pipe ends being constituted by the ends of pipe elements forming said vessel, said pipe elements having walls which collectively define the wall of the vessel, said adjacent pipe ends of the vessel being provided with recesses having bounding surfaces forming said surface which guide the radial and axial movement of the seal element, said seal element being accommodated in said recesses with clearance radially and axially and acting under the internal pressure to engage said bounding surfaces and close said circumferential gap, said seal element including a strip wound as an annular element with overlapping ends.

2. A seal assembly as claimed in claim 1 further comprising a support element disposed at said gap for supporting said seal element, said seal element having inner and outer surfaces, said support element supporting said seal element at said outer surface.

3. A seal assembly as claimed in claim 1 wherein said adjacent pipe ends of the vessel include internal webs retaining said seal element in said recesses.

4. A seal assembly as claimed in claim 1 wherein said strip is wound with a plurality of layers.

5. A seal assembly as claimed in claim 1 wherein said seal element includes local reinforcing means at said gap.

6. A seal assembly as claimed in claim 5 wherein said reinforcing means comprises a locally thickened region in said seal element at said gap.

7. A seal assembly as claimed in claim 5 wherein said reinforcing means comprises a rib in said seal element at said gap.

8. A seal assembly as claimed in claim 1 wherein said seal element is provided with transverse aperture means to furnish increased flexibility for the seal element to assist the sealing properties of said seal element in case of relative deviation in form, position and size between adjacent pipe ends.

9. A seal assembly as claimed in claim 8 wherein said strip is wound with a plurality of overlapped layers and in which the aperture means in one layer is covered by the adjacent layer.

10. A seal assembly as claimed in claim 1 wherein said strip of said seal element includes a plurality of radially and circumferentially overlapped members.

11. A seal assembly as claimed in claim 10 wherein said overlapped members of said seal element are aligned at least in part.

12. A seal assembly as claimed in claim 11 wherein said overlapped members of said seal element are of laminar construction.

13. A seal assembly as claimed in claim 10 wherein said strip is wound in a plurality of layers which are welded or brazed together.

14. A seal assembly as claimed in claim 10 comprising a sheet inserted between overlapped members.

15. A seal assembly as claimed in claim 10 wherein said overlapped members have lateral edges and means movably connecting said members at said edges.

16. A seal assembly as claimed in claim 1 wherein said seal element includes a wear-resistant, protective, surface coating.

17. A seal assembly as claimed in claim 1 wherein said seal element is made from metallic glass and is heat-resistant, and scale and abrasion-resistant.

18. A seal assembly as claimed in claim 1 comprising a retaining ring in said vessel separate from said seal element and internally and locally supporting said seal element in and between said respective recesses when the internal pressure is relieved.

19. A seal assembly as claimed in claim 1 wherein said seal element is provided with transverse aperture means, extending at an angle with respect to the circumferential direction of the seal element.

20. A seal assembly as claimed in claim 15 wherein said means connecting the members at said edges comprises a flexible cord extending circumferentially at said edges.

* * * * *